United States Patent [19]

Handl

[11] 4,335,033

[45] Jun. 15, 1982

[54] ERASER AND PROCESS FOR ITS MANUFACTURE

[75] Inventor: Werner Handl, Altdorf, Fed. Rep. of Germany

[73] Assignee: J. S. Staedtler, Nuremberg, Fed. Rep. of Germany

[21] Appl. No.: 67,001

[22] Filed: Aug. 16, 1979

[30] Foreign Application Priority Data

Aug. 25, 1978 [DE] Fed. Rep. of Germany ....... 2837159

[51] Int. Cl.³ ............................................... C08K 5/10
[52] U.S. Cl. ...................................... 524/525; 51/298; 51/299; 525/233; 525/235; 525/239; 525/241; 524/302
[58] Field of Search ............. 260/4, 31.2 N, 31.2 MR, 260/31.8 DR, 31.8 AN, 42.21, 42.32, 42.44, 23.7 A, 23.7 M; 525/233, 235, 239, 241; 51/298, 299, 300

[56] References Cited

U.S. PATENT DOCUMENTS 2,605,247  7/1952  Schule ............................. 260/42.27
3,786,011  1/1974  Price ................................. 260/4 R

OTHER PUBLICATIONS

Webster's 3rd New International Dictionary, p. 813, col. 1, (1963), G. & C. Merriam Co. Publ., Mass.

Primary Examiner—J. Ziegler
Attorney, Agent, or Firm—Toren, McGeady & Stanger

[57] ABSTRACT

An eraser based on polyvinyl chloride having particles of a crosslinked polymeric natural or synthetic rubber embedded in the polyvinyl chloride structure. Such erasers have high strength and good aging resistance. Additionally, conventional softeners in the eraser do not undergo significant migration and consequently, the eraser does not smudge. A process for manufacturing the eraser is also disclosed.

6 Claims, No Drawings

ERASER AND PROCESS FOR ITS MANUFACTURE

BACKGROUND OF THE INVENTION

1. Field of the Invention

The invention relates to an eraser based on polyvinyl chloride (PVC) which also contains softeners, fillers, and optionally, dyes and/or other additives.

2. Description of the Prior Art

Erasers based on PVC are known, for example, from German Pat. No. 932,540. Furthermore, from German Pat. No. 21 34 792, U.S. Pat. No. 2,919,180 as well as U.S. Pat. No. 3,738,951, rubber erasers are known whose matrixes consist of several rubber components.

Each type of known erasers has inherent disadvantages which are largely caused by the respective basic materials. For example, the previously known PVC erasers have relatively little strength and their softeners have a tendency to migrate. Rubber erasers have little resistance to aging and tend to smudge when used under certain conditions. Additionally, rubber erasers can be manufactured only by relatively complicated procedures.

SUMMARY OF THE INVENTION

I have discovered an eraser which does not have the disadvantages described and accordingly, has a high relative strength and good aging resistance. Moreover, the softeners do not significantly migrate and the eraser does not smudge. Additionlly, I have discovered a simple and extremely inexpensive method for manufacturing the eraser.

Particularly, I have discovered that such an eraser of the PVC type can be formed from, in addition to softeners, fillers, along with optional dyes and/or an accelerator, an unvulcanized natural or synthetic rubber in powder or pourable form, mixed in with the polyvinyl chloride or the PVC copolymer. This mixture is as extrudable as a pure PVC or a PVC copolymer material and the eraser rubber obtained combines the desirable properties of the previously known PVC type erasers, but not the negative properties.

Previously, it was thought possible to produce PVC erasers only by extrusion, while rubber erasers were manufactured by a casting or a rolling process. However, with the invention mixture, it is possible for the first time to also extrude erasers containing rubber. However, the basic requirement for doing this is that the rubber be present in unvulcanized form as a powdered or pourable material.

DESCRIPTION OF THE PREFERRED EMBODIMENT

In order to obtain the rubber components of the mixture in the unvulcanized state in powder or pourable form, various known methods, e.g., freeze-drying, may be used. Such "powdered rubbers" are obtainable as items of commerce. For the process of the present invention, the rubber material should preferably be present in particle sizes of less than 50 μm.

According to the invention, the multidimensionally, crosslinkable polymers of the rubber which, under the influence of external temperature, UV or cathode radiation or similar effects, form a multidimensional structure between individual molecules by crosslinking, are embedded in the softened PVC or PVC copolymer and firmly anchored there. The PVC preferably has a K value of about 70 and the PVC copolymer a K value between 55 and 80. Polyvinyl chloride/polyvinyl acetate may be used as the copolymer.

Rubbers or similar polymers, suitable for the purposes of the invention, include, for example:

1. natural rubber material in its various forms;
2. butadiene styrene;
3. butadiene acrylonitrile; or
4. sulfur and chlorosulfur factice.

One or several of these or similar polymers in mixture with one another are mixed in with the PVC plastisol compounded with the softener, as a result of which, for example, under the action of heat, the polymer particles crosslink and become embedded or firmly anchored in the PVC structure. As a result, the most essential properties of the eraser are incorporated while this mixture remains extrudable.

The invention is described in the following examples. All quantities refer to parts by weight.

EXAMPLE 1

In an agitator or a high-speed, high-performance mixer, PVC plastisol is prepared by stirring a softener into the powdered PVC. The polymer is stirred into this plastisol. The material so obtained is subsequently evacuated and mixed with the filler. This flowable mixture, referred to as "dry blend", is extruded at temperature ranges of 90°/110°/120°/130°/ and 135 degrees C. The strand, emerging from the orifice of the extruder, is conveyed on a roller conveyor, cooled after about 30 seconds in a water bath and subsequently cut into appropriate usable pieces.

EXAMPLE 2

| | |
|---|---|
| 41.0 | parts of PVC, |
| 13.0 | parts of di-2-ethylhexyl phthalate, |
| 28.0 | parts of filler, |
| 18.0 | parts of chlorosulfur factice |
| 100.0 | parts |

The above mixture is processed as described in Example 1.

EXAMPLE 3

| | |
|---|---|
| 40.0 | parts of PVC, |
| 10.0 | parts of di-2-ethylhexyl phthalate, |
| 29.9 | parts of filler, |
| 20.0 | parts of powdered rubber (vulcanizable) |
| 0.1 | parts of accelerator (N,N'-diphenylthiourea) |
| 100.0 | parts |

The above mixture is processed as described in Example 1.

EXAMPLE 4

| | |
|---|---|
| 35.0 | parts of PVC, |
| 8.0 | parts of di-n-butyl azelate |
| 15.0 | parts of filler |
| 42.0 | parts of acrylonitrile-butadiene rubber |
| 100.0 | parts |

The above mixture is processed as described in Example 1.

The material to be used as the filler, may be chalk, pumice powder, powdered quartz of the most widely differing particle size or a similar material, which may be more or less abrasive, depending on the intended area of application. Additional materials, which may be mixed in, are oils or waxes as extrusion aids (lubricants), sulfur or similar materials as vulcanization aids, etc.

What is claimed is:

1. An eraser consisting essentially of polyvinyl chloride or polyvinyl chloride copolymer and particles of a crosslinked natural or synthetic rubber embedded in and distributed throughout the polyvinyl chloride or polyvinyl chloride copolymer structure.

2. The eraser of claim 1 wherein the rubber is selected from the group consisting of natural rubber, butadiene styrene, and butadiene acrylonitrile.

3. The eraser of claim 1 wherein a polyvinyl chloride copolymer is used having a K value between 55 and 80.

4. The eraser of claim 1 wherein polyvinyl chloride is used having a K value of about 70.

5. An eraser consisting essentially of polyvinyl chloride or polyvinyl chloride copolymer and particles of a crosslinked natural or synthetic rubber embedded in and distributed throughout the polyvinyl chloride or polyvinyl chloride copolymer structure and softeners and dyes.

6. An eraser consisting essentially of 30 to 60 parts by weight of polyvinyl chloride, 10 to 20 percent of a softener, 10 to 40 percent of a filler and 10 to 60 percent of a cross-linked natural or synthetic rubber in the form of particles embedded in and distributed throughout the polyvinyl chloride.

* * * * *